UNITED STATES PATENT OFFICE.

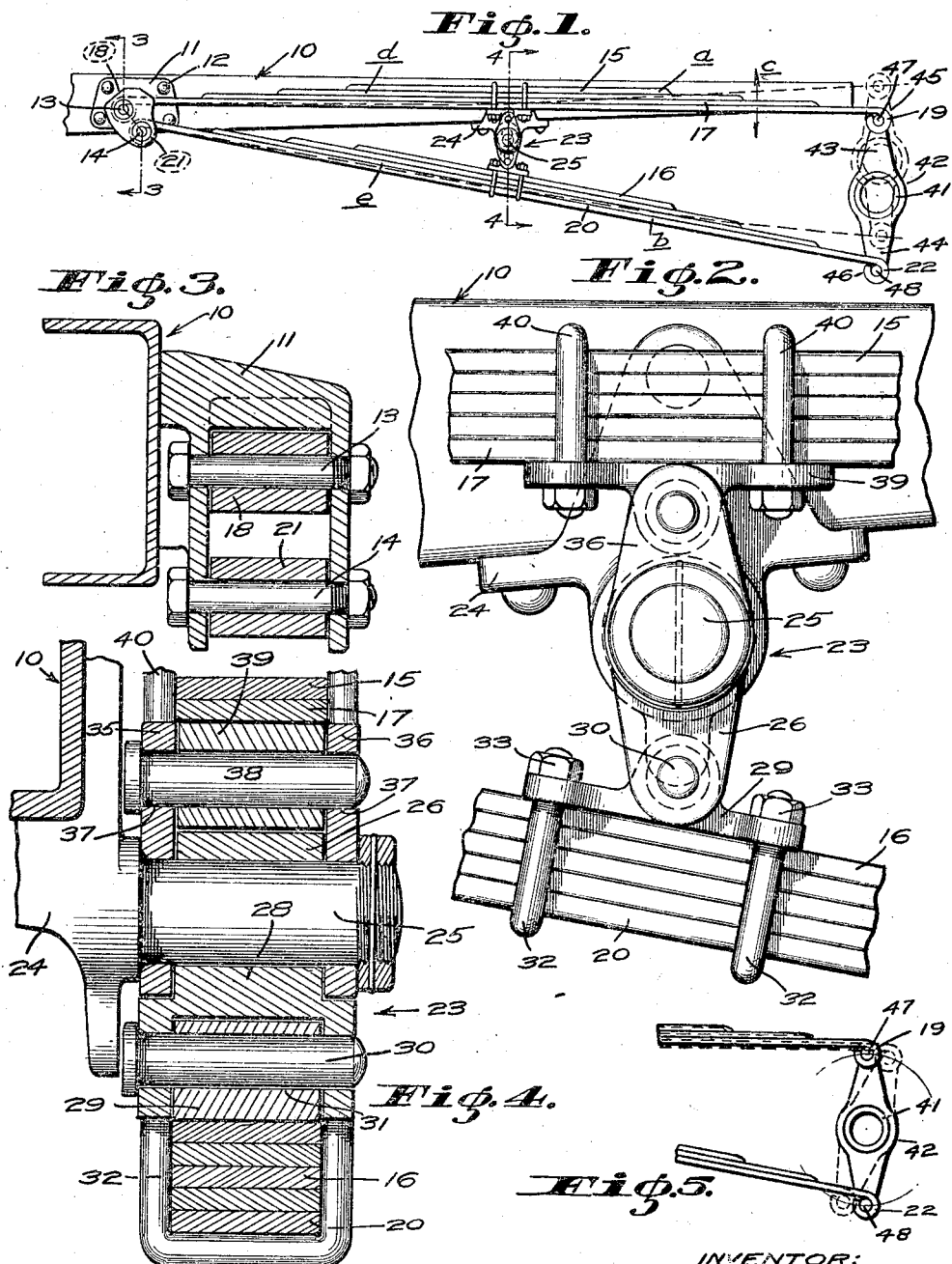

HOMER LAUGHLIN, JR., AND CHARLES A. F. DUCORRON, OF LOS ANGELES, CALIFORNIA, ASSIGNORS TO HOMER LAUGHLIN ENGINEERS CORPORATION, OF LOS ANGELES, CALIFORNIA, A CORPORATION OF CALIFORNIA.

SPRING SUSPENSION.

1,277,087.  Specification of Letters Patent.  Patented Aug. 27, 1918.

Application filed September 24, 1917. Serial No. 192,943.

*To all whom it may concern:*

Be it known that we, HOMER LAUGHLIN, Jr., and CHARLES A. F. DUCORRON, citizens of the United States, residing at Los Angeles, in the county of Los Angeles and State of California, have invented new and useful Improvements in Spring Suspensions, of which the following is a specification.

Our invention relates to a spring suspension for cushioning movement between relatively movable bodies and pertains particularly to a vehicle spring of the cantaliver type.

It is an object of our invention to provide a spring suspension for mounting an axle in yieldable relation to a vehicle frame which will combine the features of a cantaliver spring and a shock absorber within one set of springs.

It is another object of our invention to provide a spring suspension which embodies the use of one or more long leaf springs of light construction, and a spring mounting whereby a portion of each spring is used cantaliver fashion to resiliently support a vehicle in relation to its axle and the remaining portion is utilized to absorb the shock imparted to the spring and which would otherwise be transmitted through the spring mounting to the vehicle frame.

Another object is to provide a spring suspension for vehicles which insures that all road shocks will be substantially absorbed within the body of the spring member.

Another object is to provide a spring suspension for mounting an axle in resilient relation to a vehicle frame which insures that the vertical transverse axis of said axle be maintained in an approximately vertical position throughout the radial movement of said axle in relation to the spring suspension means.

Due to the fact that a spring of the cantaliver type has an amount of flexibility not common to other vehicle springs, and has a greater range of deflection than springs of elliptical or semi-elliptical shapes, it is desirable that such a spring be employed in automobile design. The use of a cantaliver spring has, however, been limited owing to the fact that heavy springs were required and that mountings of considerable weight were needed to anchor them to the vehicle frame in comparison to the load carried. With this idea in view, we have devised a cantaliver spring which will eliminate the necessity of using heavy stock in forming the cantaliver springs and corresponding mountings, and employ light weight springs of common construction which will require light weight mountings and at the same time produce an effective and economical cantaliver spring.

It is a further object of this invention to provide a spring mounting for resiliently supporting a vehicle axle which will prevent axial movement of the axle to a considerable extent and will eliminate the use of torsion rods and radius rods as are now required by most vehicles to resist the road shocks and the force exerted upon the application of the brakes.

In carrying out our invention, we preferably employ a pair of superposed divergently arranged substantially straight spring members having their contiguous ends attached to one movable body, as a vehicle frame, and their spaced outer ends connected to another body, as an axle, with a shiftable fulcrum interposed between the spring members intermediate their ends so that they may flex throughout their lengths.

Other objects will appear hereinafter.

The invention is illustrated in the accompanying drawings in which:

Figure 1 is a view in side elevation showing the preferred application of our spring suspension and showing the springs as deflected in dotted lines.

Fig. 2 is a view in side elevation and shows the central spring mounting in detail.

Fig. 3 is a view in vertical section taken upon the line 3—3 of Fig. 1.

Fig. 4 is a view in vertical section taken upon the line 4—4 of Fig. 2.

Fig. 5 is a fragmentary view illustrating the spring bracket as loosely mounted upon the rear vehicle axle.

Referring to the drawings, 10 indicates a vehicle frame which lies in a horizontal plane and has mounted upon its outer face a spring bracket 11 secured by bolts or rivets 12. The spring bracket 11 is positioned at a suitable distance from the end of the frame and has mounted thereon fixed spring bolts 13 and 14 to pivotally engage the contiguous ends of a pair of divergent spring members 15 and 16. The upper spring member 15 is preferably arranged to lie substantially in a horizontal position throughout its length and is here shown as comprising four leaves of decreasing lengths, the lower leaf 17 being formed with eyes 18 and 19 at its terminals. The eye 18 engages the bolt 13 and the other eye is disposed rearwardly and is preferably clear of the end of the frame.

The lower spring member 16 corresponds in length to the spring 15 and is placed below the latter and in line with it in a vertical plane, and at a pronounced incline when seen in side elevation. The masterleaf 20 of spring 16 is lowermost in the arrangement of its leaves which are of a similar number to the upper spring member 15 and is secured by an eye 21 to the spring bolt 14. The opposite end of the leaf 20 terminates in an eye 22, arranged in vertical alinement with the eye 19 on spring 15, this being due to the fact that the bolt 14 is off-set in advance of the bolt 13, as shown in Fig. 1.

In order to sustain the springs in the position shown in Fig. 1 we have provided an intermediate support for each of said springs. This support or hanger 23 consists of a bracket 24 adapted to be bolted to the frame approximately mid-way the length of the spring and has formed integral with its bolting flange a horizontally extending pivot pin 25. The pivot pin 25 is of sufficient length to extend between the diverging spring members and is adapted to support the lower member by means of a shackle 26 which is mounted upon the pivot 25. The shackle 26 is formed with a bifurcated lower portion 28 between the arms of which a spring supporting pad 29 is mounted. The pad 29 is pivoted in relation to the portion 28 of the shackle by means of a pin 30 which extends through openings in the bifurcated portion 28 and registers with an opening 31 in the pad. Support is afforded the spring 16 by means of spring clips 32 which are U-shaped and extend around and over the sides of the spring and are provided with threaded ends which pass through openings formed in the pad 29, and are engaged by nuts 33.

The upper spring 15 is supported in relation to the pivot 25 by means of shackles 35 and 36 adapted to pass over the pivot pin and lie upon either side of the body portion of shackle 26. The upper portions of shackles 35 and 36 are formed with horizontally extending bores 37 therethrough adapted to receive a pin 38, this pin being in engagement with an upper spring pad 39 within which spring clips 40 are mounted to encompass and hold in position the upper spring member 15. By this manner of supporting the two spring members 15 and 16 near their centers we have provided a shiftable fulcrum support which allows radial movement of the springs around the pin 25 and permits flexure of the springs throughout their lengths.

A vehicle axle 41 is secured to the eyes 18 and 19 on the outer ends of the springs by means of a double spring bracket or spider 42 which is formed with an upwardly extending arm 43 and an integral downwardly extending arm 44. The arms 43 and 44 are arranged and mounted along the transverse vertical axis of the axle and terminates at their outer ends with bosses 45 and 46 adapted to receive spring bolts 47 and 48 which pass through the eyes 18 and 19 of the masterleaves of each spring member 15 and 16. The spider 42 thus lies in an approximately vertical plane and provides a fixed mounting for the axle upon the spring suspension means. It will be noted that the portions of the springs —a— and —b— are of different lengths as are also the portions —d— and —e— and that portions —b— and —d— are longer than the lengths —a— and —e—.

In other words the shock-absorbing effect is due to the interference of one spring with the other by setting one spring at an incline to the other and mismatching in length the corresponding parts of the two springs, thus tending to produce divergent and conflicting forces and motions, all at the instant of shock.

When a vehicle is provided with a spring suspension as herein shown and described the spring action and its relation to the vehicle and axle will be as follows:

When a load is applied to the vehicle frame 10 or a shock imparted to a wheel of the vehicle axle 14, the initial impulse will be transmitted to the outer cantaliver portions —a— and —b— of the spring sheaves 15 and 16, respectively, and equally. This will cause said spring portions to be deflected in the direction indicated by the arrow —c— and will allow the axle to move through an arc which is determined by the length of the springs, the differential lengths of their portions —a—, —b—, —d— and —e—, and their angular position in relation to each other. It will thus be noted that the portions —a— and —b— will act in the manner common to cantaliver springs from the pivot 25 of the hanger 23.

In common cantaliver spring construction the spring portions —a— and —b— would form the portions —d— and —e— at a central fixed pivotal mounting and the ends of —d— and —e— would be shackled to the frame, but we have provided a suitable pivotal mounting 23 as before stated. In this manner the greater percentage of the shock or load upon the cantaliver spring portions —a— and —b— of springs 15 and 16 will be transmitted to the complementary portions —d— and —e— of each spring extending between the bolts 13 and 14 and the mounting 23. The result of such an arrangement is that when the spring members are moved in the direction indicated by the arrow —c— they will rotate at approximately their centers upon their shackle pivotally mounted upon pivot 25. The movement of said rotation allows a percentage of the load to be thrown on the semi-rigid spring portions —d— and —e— and will cause them to be deflected in an opposite direction from the deflection of the portions —a— and —b—. This resiliency acts to absorb the shock and prevent its being transmitted by the spring mounting to the frame of the vehicle.

One of the objectionable features in vehicle spring suspension is that a spring which has sufficient resiliency to produce desirable riding qualities will act with a rebound when violent road shocks are produced. This has been eliminated in our construction by placing the springs in divergent relation to each other and differentially the lengths of portions —a— and —b— and —d— and —e— and mounting their contiguous ends within bracket 11 in an off-set relation to each other and securing their opposite ends to the spider 42 upon the axle 41 in vertical alinement with the vertical axis of the axle. When the spring tends to rebound the disagreement between the arcs upon which each spring swings will cause them to oppose each other and absorb said rebound shock within the body of the spring without transmitting an objectionable portion of it to the vehicle. Incidentally this arrangement of the springs will cause the axle to maintain an approximately uniform position as to the vertical during its arc of travel.

While we have shown the springs as arranged divergently and with portions of different lengths, it is obvious that desirable results might be obtained by the utilization of either arrangement without the other.

It will thus be seen that we have provided a spring suspension for vehicles which embodies all of the desirable features of a cantaliver spring as well as incorporating a suitable shock absorber therein, in a construction which will be light in weight, by which shock springs may be utilized.

What we claim is:—

1. A spring suspension construction, comprising a straight upper spring, a straight lower spring, a hanger, means for pivotally connecting the hanger to the central portions of the springs, a bracket pivotally connected to contiguous ends of the springs, and a double bracket pivotally connected to the opposite ends of the springs, said double bracket being long and the first bracket being short so as to set one spring at an incline relative to the other.

2. A spring suspension construction, comprising two straight springs, means for connecting the central portions of the springs together, means for connecting the forward ends of the springs close together, and means for connecting the rear ends of the springs together wide apart, so that one spring is inclined relative to the other.

In testimony whereof we have signed our names to this specification.

HOMER LAUGHLIN, Jr.
C. A. F. DUCORRON.